United States Patent [19]
Hodson

[11] 4,357,303
[45] Nov. 2, 1982

[54] APPARATUS FOR REFLUORINATING URANIUM PENTAFLUORIDE PRECIPITATE

[75] Inventor: Donald R. Hodson, Thousand Oaks, Calif.

[73] Assignee: Rockwell International Corporation, El Segundo, Calif.

[21] Appl. No.: 135,384

[22] Filed: Mar. 31, 1980

[51] Int. Cl.³ .............................................. B01J 8/08
[52] U.S. Cl. ...................................... 422/159; 422/187
[58] Field of Search ................ 422/159, 187; 417/435, 417/49; 423/19; 134/20, 39

[56] References Cited

U.S. PATENT DOCUMENTS

1,230,654  6/1917  Berry ................................. 134/39
2,881,102  4/1959  Lidecker ........................... 134/20

Primary Examiner—Michael S. Marcus
Attorney, Agent, or Firm—H. F. Hamann; Harry B. Field

[57] ABSTRACT

A positive-displacement compressor receives a gaseous mixture of fluorine and uranium pentafluoride particles. The mixture is compressed by the compressor to cause the fluorine in the gas to react with the uranium pentafluoride to form uranium hexafluoride. The compressed mixture in the compressor is removed by a stream of warm fluorine gas to scavenge the excess particulate matter from the compressor and enhance the refluorination process.

2 Claims, 10 Drawing Figures

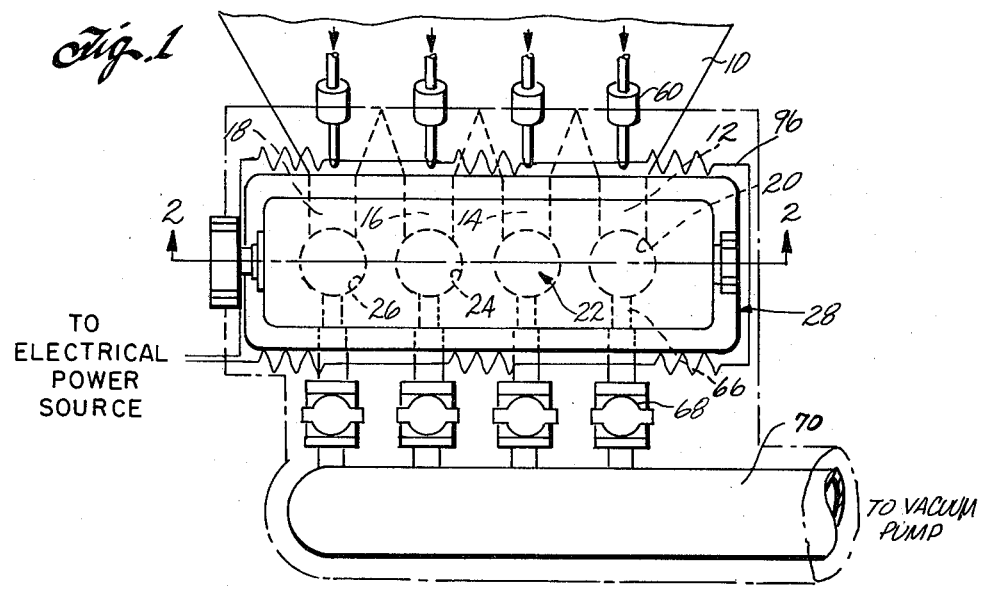
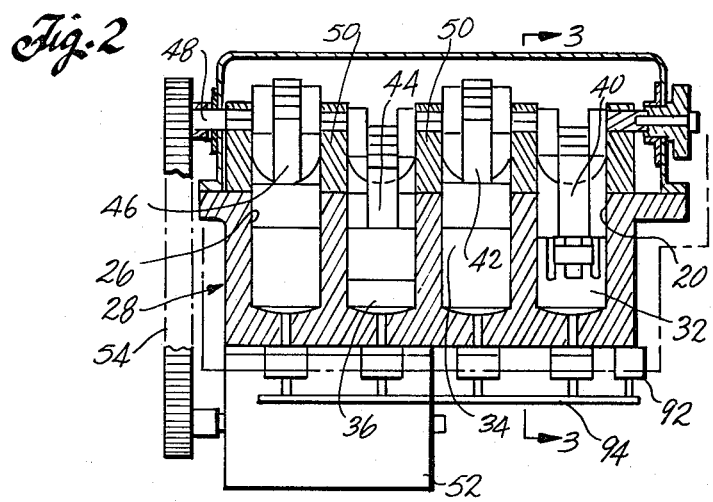
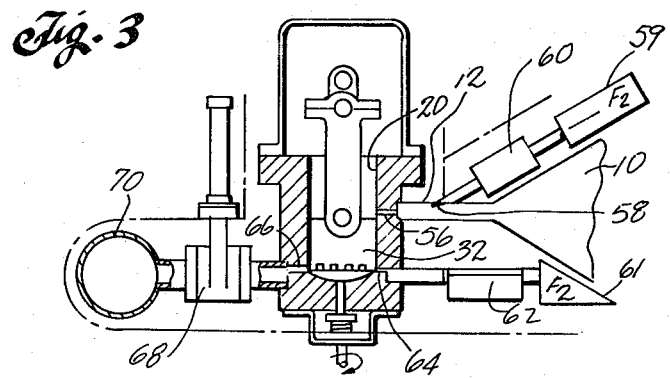

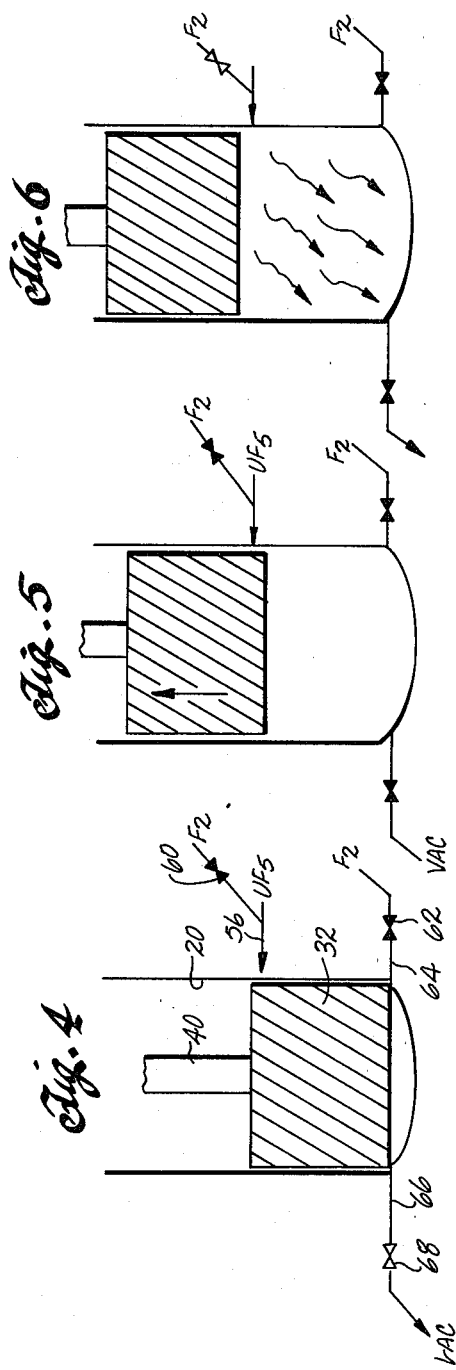

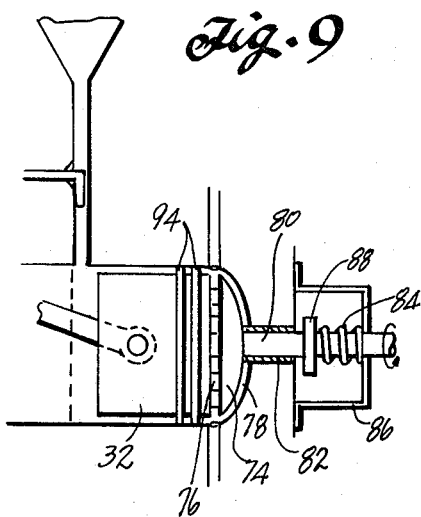
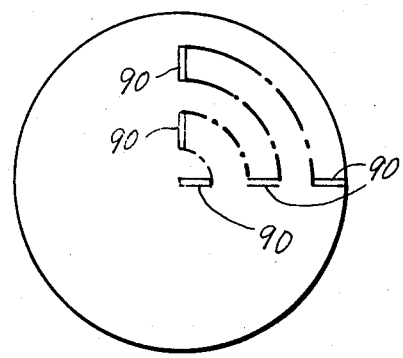

APPARATUS FOR REFLUORINATING URANIUM PENTAFLUORIDE PRECIPITATE

FIELD OF THE INVENTION

This invention relates to apparatus for fluorinating particulate matter, and more particularly, to a compressor for enhancing the reaction between fluorine gas and uranium pentafluoride particles.

BACKGROUND OF THE INVENTION

In copending application Ser. No. 168,877 filed July 14, 1980, entitled PHOTOCHEMICAL REACTION CAVITY by the same inventor as the present application and assigned to the same assignee, there is described an optical cavity for use in a process for enriching uranium by increasing the percentage of $U_{235}$. Laser beams of two different frequencies are used to produce a photochemical reaction in which an atom of fluorine is stripped from a molecule of $UF_6$, a gas, to precipitate out $UF_5$ which is a solid. The $UF_5$ powder, which has a higher concentration of $U_{235}$ isotopes, must then be refluorinated to produce $UF_6$ gas also having a higher concentration of $U_{235}$ isotopes. This basic enrichment process has been described in the literature. See, for example, the brochure, "Introduction to Laser Isotope Separation" published by the Los Alamos Scientific Laboratory, publication LASL-78-13 of the Applied Photochemistry Division.

SUMMARY OF THE INVENTION

The present invention is directed to an improved apparatus for refluorinating the uranium pentafluoride $UF_5$ powder after enrichment of $U_{235}$ isotopes to provide the more useful gas, uranium hexafluoride $UF_6$. The refluoridation apparatus of the present invention includes a positive displacement type compressor with means directing a charge of a gaseous mixture containing a fluorine gas with suspended particles of uranium pentafluoride into the compressor at the start of a compression cycle. When the mixture is fully compressed, a source of fluorine gas under pressure is used to flush out the compressed gaseous mixture from the compressor cylinders including any uranium pentafluoride particles which have not been refluorinated during the compression.

BRIEF DESCRIPTION OF THE DRAWINGS

For a more complete understanding of the invention reference should be made to the accompanying drawings, wherein:

FIG. 1 is a top view of the apparatus of the present invention;

FIG. 2 is a sectional view taken substantially on the line 2—2 of FIG. 1;

FIG. 3 is a sectional view taken substantially on the line 3—3 of FIG. 2;

FIGS. 4-8 are a series of diagramatic views showing the compression cycle in the refluorination operation;

FIG. 9 is a detailed cross-sectional view of the cylinder and piston construction; and FIG. 10 is a sectional view taken on the line 10—10 of FIG. 9.

DETAILED DESCRIPTION

Referring to FIGS. 1-3 in detail, the numeral 10 indicates generally a hopper which stores uranium pentafluoride $UF_5$ in powder form. The hopper is part of an entirely closed system in which the $UF_5$ is precipitated out of a gaseous stream of uranium hexafluoride $UF_6$ by a photochemical process such as described in the above-identified copending application. The $UF_5$ may be separated out from the gas stream by a cyclone separator, for example. The bottom of the hopper 10 is divided into four discharge passages indicated at 12, 14, 16 and 18, each of which is connected to a port in an associated one of four cylinders 20, 22, 24 and 26 of a compressor assembly 28.

The compressor assembly 28 is of generally conventional design for a four-cylinder, positive-displacement compressor. Thus the compressor assembly includes a block 30 in which the four cylinders are formed. Each cylinder receives a piston, as indicated at 32, 34, 36 and 38. The pistons are connected by suitable piston rods 40, 42, 44 and 46 to a crank shaft 48, the crank shaft being journaled in suitable bearing box 50. The crank shaft is driven by a motor 52 through a chain drive 54, rotation of the crank shaft 48 causing the pistons to reciprocate in the respective cylinders.

As best seen in FIG. 3, the passages 12-18 of the hopper 10 opens through ports 56 in the wall of the respective cylinders 20-26. The position of the port is such that the port is open and closed by the piston as it moves in the cylinder. The $UF_5$ powder from the hopper 10 is fluidized and injected into the respective cylinders by a gas stream from a first source 59 which is preferably gaseous fluorine or any suitable fluorine donor gas molecule or mix of gases mixed with an inert gas. The gas is inserted into the respective passages 12, 14, 16 and 18 through injection nozzles, such as indicated at 58 in FIG. 3. The injection of the gas stream is controlled by an associated valve 60, the valve being opened to coincide with the opening of the port 56 as the piston reaches the end of its stroke. Thus a mixture of fluorine donor gas and $UF_5$ powder in a measured charge is injected into the respective cylinders to be compressed by the reciprocal motion of the pistons.

When the mixture of fluorine and $UF_5$ is fully compressed, some of the fluorine atoms react with the uranium pentafluoride to form uranium hexafluoride $UF_6$. The compressed mixture is flushed out of the associated cylinder by injecting additional fluorine donor gas under pressure from a second source 61 through a valve and heating element 62 into the end of the cylinder through a port 64. The fluorine flush gas stream and compressed mixture are flushed out of the cylinder through another port 66 in the end of the cylinder through a valve 68 into an outlet manifold 70. The manifold may be connected to a vacuum pump (not shown) which continuously exhausts the refluorinated material from the output of the compressor.

The four sets of valves 60, 62 and 68 may be opened and closed either mechanically or electrically in conventional manner so that the operation of the valves is timed with the rotation of the crank shaft 48. The timing sequence is shown by the diagram of FIGS. 4-8. As shown in FIG. 4, the piston 32 is at the compression end of the stroke in which the volume of the cylinder 20 is reduced to its minimum, for example, 10 cc. With the valve 68 open and the valve 62 closed, the pressure in the cylinder is reduced to the subatmospheric value of approximately 100 torr. In FIG. 5, with both the valves 62 and 68 closed, and the volume of the cylinder increased to 900 cc., the pressure drops to 1.1 torr. At the end of the stroke, as shown in FIG. 6, the port 56 is opened and the valve 60 is opened to inject a mixture of UF$_5$ and F$_2$ into the cylinder. The volume of the cylinder reaches its maximum of 1000 cc. and the pressure increased to 80 torr. As the piston 32 reaches the compression end of its stroke, as shown in FIG. 7, with both the valves 62 and 68 closed, the pressure builds up to 8000 torr as the volume decreases to 10 cc. At the compression end of the stroke, as shown in FIG. 8, both the valves 62 and 68 are opened allowing the compressed mixture to be flushed from the cylinder. The cycle is then repeated. The above pressure and volume values are given by way of example only.

In order to prevent buildup of UF$_5$ on the end of the cylinders, a rotating scraper is provided in each cylinder. As shown in FIGS. 9 and 10, the scraper is in the form of a disc 74 which has a flat outer surface 76 and a back surface which is contoured to fit the end of the cylinder, as indicated at 78. The disc 74 is secured to the end of a shaft 80 which is journaled in a sleeve 82 in the compressor block. Thus the scraper can rotate or move axially within the cylinder. A spring 84 normally urges the scraper towards the head of the piston, the spring extending between a bracket 86, mounted on the outside of the block and having a hole through which the shaft 80 projects, and a retainer 88 secured to the shaft 80. The retainer 88 acts as a stop, limiting motion of the scraper axially into the cylinder. As shown in FIG. 10, the flat face 76 of the scraper has a plurality of scraper fingers 90 which project toward the top of the associated piston. The fingers are so positioned that as the scraper is rotated, the fingers move in circular paths across the surface of the piston to scavenge any UF$_5$ particles that tend to accumulate. The shaft may be rotated in any suitable manner such as by motor 92 and chain drive 94, as shown in FIG. 2. At the end of the stroke, the face of the piston 32 comes into contact with the ends of the scraper fingers 90, compressing the spring 84 slightly. While in contact with the piston, the fingers 90 are rotated so as to scour the surface of the piston. The piston may also be provided with rings 94 which scavenge the walls of the cylinder to prevent any buildup of UF$_5$ particles. The walls of the cylinders also may be heated by an external heater system 96 to a temperature which tends to vaporize the UF$_5$ particles. The external heater system 96 is not to be restricted to any particular method, but may, for example, be a thermal trace wire.

From the above description it will be seen that an apparatus is provided which provides optimum conditions of pressure and temperature to enhance mixing, intermolecular collision and reaction to cause the UF$_5$ and F$_2$ to combine to produce UF$_6$. While fluorine gas has been described as the preferred embodiment, other sources of fluorine atoms may be used.

The apparatus provides for substantially continuous operation because of the overlapping compression cycles of the four cylinders. The self-cleaning action ensures operation with a minimum of down time to service and clean out the cylinder chambers of the compressor.

It is to be understood that what has been described is merely illustrative of the principles of the invention and that numerous arrangements in accordance with this invention may be devised by one skilled in the art without departing from the spirit and scope thereof.

What is claimed is:

1. Apparatus for converting uranium pentafluoride in particulate form to gaseous uranium hexafluoride, comprising:
   means for providing uranium pentafluoride particles;
   means for receiving, mixing and suspending said particles in a gas containing fluorine, said particles received from said providing means;
   a piston-displacement compressor having:
      a cylinder;
      a reciprocating piston;
      a first inlet to said cylinder through which said particulate uranium pentafluoride and said fluorine are charged into said cylinder;
   a second inlet to said cylinder, through which a gaseous fluorine purge gas is directed;
   means connecting a source of purge gas to said second inlet;
   an outlet; for eliminating said gaseous uranium hexafluoride and unreacted uranium pentafluoride and said fluorine;
   valve means on said second inlet and said outlet; and
   means opening said valves when said gas and particulate mixture in said cylinder is substantially fully compressed by said piston to purge the compressed mixture out of said cylinder.

2. Apparatus of claim 1 wherein said piston permits the mixed gas and particle flow through said first inlet only when said piston is in a substantially non-compressed position.

* * * * *